US012291045B2

(12) United States Patent
Yamaguchi

(10) Patent No.: US 12,291,045 B2
(45) Date of Patent: May 6, 2025

(54) LIQUID EJECTING DEVICE

(71) Applicant: SEIKO EPSON CORPORATION, Tokyo (JP)

(72) Inventor: Kenji Yamaguchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 139 days.

(21) Appl. No.: 18/343,574

(22) Filed: Jun. 28, 2023

(65) Prior Publication Data

US 2024/0001698 A1 Jan. 4, 2024

(30) Foreign Application Priority Data

Jun. 30, 2022 (JP) ................................ 2022-105587

(51) Int. Cl.
*B41J 29/17* (2006.01)
*B41J 11/00* (2006.01)

(52) U.S. Cl.
CPC ............. *B41J 29/17* (2013.01); *B41J 11/007* (2013.01)

(58) Field of Classification Search
CPC ........ B41J 11/007; B41J 29/17; B41J 15/048; B41J 2002/16591
See application file for complete search history.

(56) References Cited

U.S. PATENT DOCUMENTS

2007/0171251 A1* 7/2007 Sekimoto ............... B41J 11/007 347/22
2018/0099512 A1* 4/2018 Amari .................... B41J 13/025
2021/0229469 A1* 7/2021 Asamoto ................ B41J 11/007

FOREIGN PATENT DOCUMENTS

JP 2020-90356 A 6/2020

* cited by examiner

*Primary Examiner* — Scott A Richmond
(74) *Attorney, Agent, or Firm* — WORKMAN NYDEGGER

(57) ABSTRACT

A liquid ejecting device includes: a transport unit including a transporting belt at which a medium is mounted with the transporting belt in contact with a first surface of the medium, the transporting belt having an endless shape and configured to transport the medium in a transport direction, the transport unit also including a first roller and a second roller over which the transporting belt is stretched; an ejecting unit configured to eject a liquid to a second surface of the medium mounted at the transporting belt downstream of the first roller in a circumferential direction of the transporting belt and upstream of the second roller; a cleaning unit configured to clean a portion of the transporting belt downstream of the second roller in the circumferential direction of the transporting belt and upstream of the first roller, the portion being a portion at which the medium is not mounted; and a removing unit provided upstream of the first roller in the transport direction and configured to remove deposits deposited on the medium, in which the removing unit is brought into contact with the second surface of the medium, and is brought into contact with a portion of the transporting belt where the medium is not mounted.

10 Claims, 4 Drawing Sheets

LIQUID EJECTING DEVICE

The present application is based on, and claims priority from JP Application Serial Number 2022-105587, filed on Jun. 30, 2022, the disclosure of which is hereby incorporated by reference herein in its entirety.

BACKGROUND

1. Technical Field

The present disclosure relates to a liquid ejecting device.

2. Related Art

Typically, as described in JP-A-2020-90356, there is known a device that includes a removing unit including a dedicated belt used to remove attached matters on a fabric, and a dedicated cleaning tank used to cleaning the belt.

However, the device described in JP-A-2020-90356 requires a large number of dedicated components to remove the attached matters on the fabric, and this possibly leads to a complicated configuration.

SUMMARY

A liquid ejecting device includes a transport unit including a transporting belt at which a medium is mounted with the transporting belt in contact with a first surface of the medium, the transporting belt having an endless shape and configured to transport the medium in a transport direction, the transport unit also including a first roller and a second roller over which the transporting belt is stretched, an ejecting unit configured to eject a liquid to a second surface of the medium mounted at the transporting belt downstream of the first roller in a circumferential direction of the transporting belt and upstream of the second roller, a cleaning unit configured to clean a portion of the transporting belt downstream of the second roller in the circumferential direction of the transporting belt and upstream of the first roller, the portion being a portion at which the medium is not mounted, and a removing unit provided upstream of the first roller in the transport direction and configured to remove deposits deposited on the medium, in which the removing unit is brought into contact with the second surface of the medium, and is brought into contact with a portion of the transporting belt where the medium is not mounted.

A liquid ejecting device includes a transport unit including a transporting belt at which a medium is mounted with the transporting belt in contact with a first surface of the medium, the transporting belt having an endless shape and configured to transport the medium in a transport direction, the transport unit also including a first roller and a second roller over which the transporting belt is stretched, an ejecting unit configured to eject a liquid to a second surface of the medium mounted at the transporting belt downstream of the first roller in a circumferential direction of the transporting belt and upstream of the second roller, a cleaning unit configured to clean a portion of the transporting belt downstream of the second roller in the circumferential direction of the transporting belt and upstream of the first roller, the portion being a portion at which the medium is not mounted, and a removing unit provided upstream of the first roller in the transport direction and configured to remove deposits deposited on the medium, in which the removing unit includes an air blowing unit configured to blow a gas along a flow path running through the second surface of the medium toward a portion where the medium is not mounted.

DESCRIPTION OF EXEMPLARY EMBODIMENTS

Figure 1:
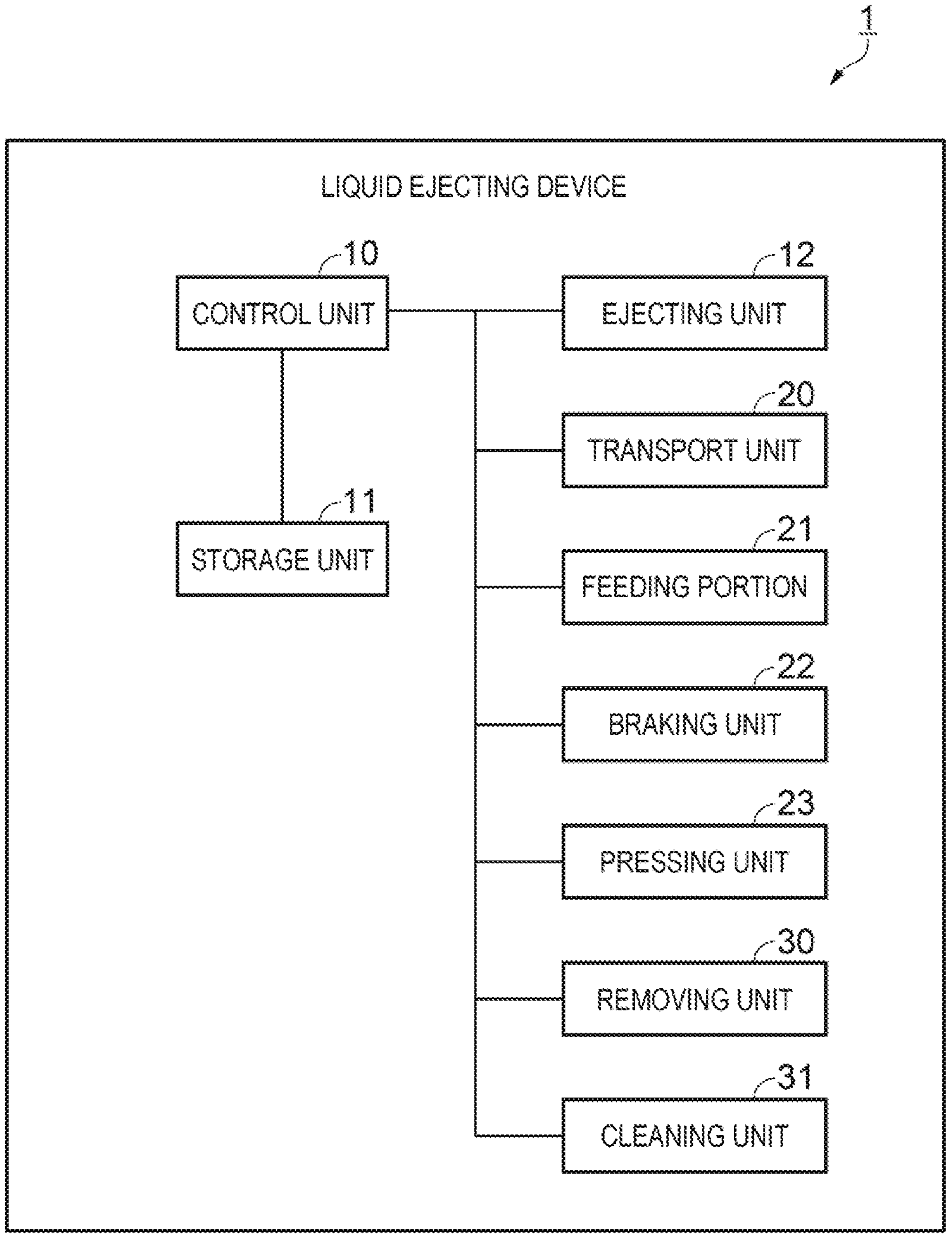
FIG. 1 is a block diagram illustrating the configuration of a liquid ejecting device according to an embodiment.

Below, embodiment will be described with reference to the drawings. Note that the directions in the drawings will be described using a three-dimensional coordinate system in which the X-axis, the Y-axis, and the Z-axis are perpendicular to each other. At this time, the direction along the X-axis is set as the X direction, the direction along the Y-axis is set as the Y direction, and the direction along the Z-axis is set as the Z direction. For the purposed of convenience in explanation, description will be made such that the positive direction of the Z direction is referred to as an upward direction, the negative direction thereof is referred to as a downward direction or simply as downward, the positive direction of the X direction is referred to as a rightward direction or simply as rightward, the negative direction thereof is referred to as a leftward direction or simply as leftward, the positive direction of the Y direction is referred to as a frontward direction or simply as frontward, and the negative direction thereof is referred to as a rearward direction or simply as rearward.

1. Liquid Ejecting Device According to First Embodiment

As illustrated in FIG. 1, the liquid ejecting device 1 according to the first embodiment is configured to include a control unit 10, a storage unit 11, an ejecting unit 12, a transport unit 20, a feeding portion 21, a braking unit 22, a pressing unit 23, a removing unit 30, and a cleaning unit 31. The configuration of the liquid ejecting device 1 according to the first embodiment will be described with reference to FIG. 2.

The control unit 10 is configured to include a central processing unit (CPU) configured to comprehensively control each component of the liquid ejecting device 1, a universal asynchronous receiver transmitter (UART) configured to manage input and output, a field programmable gate array (FPGA) or a programmable logic device (PLD) that are logical circuits, or the like. The CPU is also simply referred to as a processor. The storage unit 11 is configured to include a flash read only memory (ROM) or a hard disk drive (HDD) that are rewritable nonvolatile memories, a random access memory (RAM) that is a volatile memory, or the like.

The CPU of the control unit 10 reads out a program such as firmware or the like stored in a nonvolatile memory of the storage unit 11, and implements it by using the RAM of the storage unit 11 as a working region.

Figure 2:
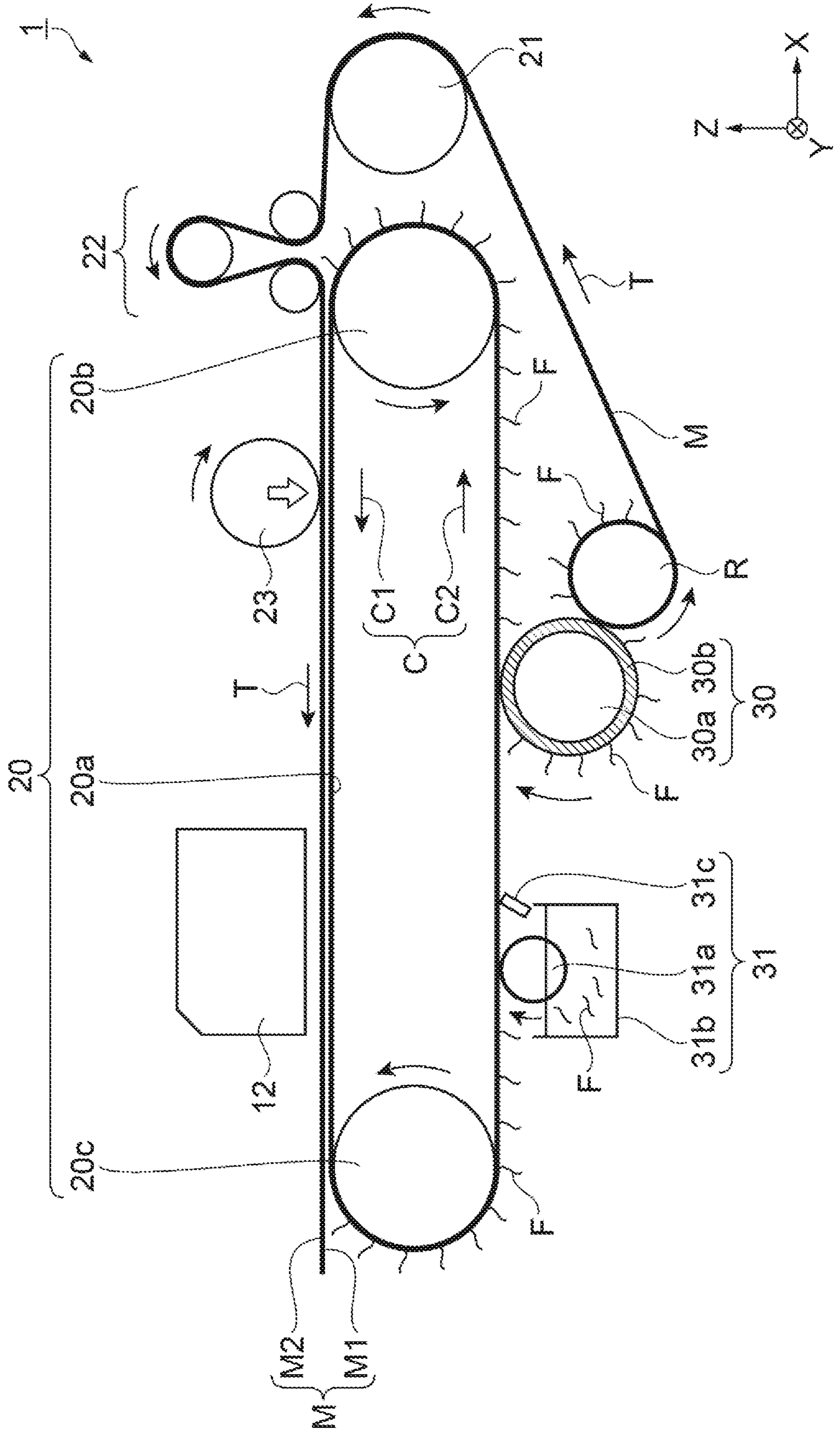
FIG. 2 is a schematic view illustrating the configuration of a liquid ejecting device according to a first embodiment.

A medium M illustrated in FIG. 2 is a long-length fabric made of natural fiber, synthetic fiber, or the like, for example. The long-length fabric is also referred to as an original sheet. The liquid ejecting device 1 performs recording on the medium M. Recoding on a fabric is also referred to as textile printing, and the medium M is also referred to as a printing target material.

The medium M includes a first surface M1 serving as a transport surface to be transported, and also includes a second surface M2 serving as a recording surface on which recording is performed. In addition, the medium M includes a roll unit R wound around a roll shaft. An attached matter F such as lint may be attached on the medium M. When the attached matter F is attached on the second surface M2, there is a possibility that the recording quality deteriorates.

As illustrated in FIG. 2, the transport unit 20 is configured to include a transporting belt 20*a* having an endless shape, a driving roller 20*b* serving as a first roller, and a driven roller 20*c* serving as a second roller. The transporting belt 20*a* is stretched over the driving roller 20*b* and the driven roller 20*c*.

The transporting belt 20*a* is brought into contact with the first surface M1 of the medium M, and the medium M is mounted at the transporting belt 20*a*. The transporting belt 20*a* transports the medium M in the transport direction T between the driving roller 20*b* and the driven roller 20*c*.

A glue serving as an adhesive having adhesiveness is provided at the front surface of the transporting belt 20*a* that is a side brought into contact with the first surface M1 of the medium M, and is able to cause the medium M to adhere thereto. The glue is configured to contain, for example, silicone resin.

With a transport motor that is not illustrated, the transport unit 20 causes the driving roller 20*b* to rotate counterclockwise, and causes the driven roller 20*c* to follow to rotate counterclockwise. The transporting belt 20*a* stretched over the driving roller 20*b* and the driven roller 20*c* is also configured to circulate counterclockwise that is a circumferential direction C.

The circumferential direction C includes an outward direction C1 from the driving roller 20*b* toward the driven roller 20*c* with the driving roller 20*b* being the reference, and also includes a return direction C2 from the driven roller 20*c* toward the driving roller 20*b*. Note that the relationship between the driving roller 20*b* and the driven roller 20*c* may be opposite in terms of driving and being driven.

The outward direction C1 of the transporting belt 20*a* is the same direction as the transport direction T of the medium M mounted at the transporting belt 20*a* and traveling from the driving roller 20*b* toward the driven roller 20*c*.

Note that a portion of the transporting belt 20*a* traveling toward the outward direction C1 is a portion of the transporting belt 20*a* at which the medium M is mounted, and a portion of the transporting belt 20*a* traveling toward the return direction C2 is a portion of the transporting belt 20*a* at which the medium M is not mounted.

The ejecting unit 12 is disposed downstream of the driving roller 20*b* and also upstream of the driven roller 20*c* in the circumferential direction C of the transporting belt 20*a* and in the transport direction T. The ejecting unit 12 ejects a liquid to the second surface M2 of the medium M mounted at the transporting belt 20*a* toward the outward direction C1.

In addition, the cleaning unit 31 is disposed downstream of the driven roller 20*c* and upstream of the driving roller 20*b* in the circumferential direction C of the transporting belt 20*a*. The cleaning unit 31 cleans a portion of the transporting belt 20*a* traveling toward the return direction C2, the portion being a portion at which the medium M is not mounted.

The removing unit 30, the roll unit R, the feeding portion 21, the braking unit 22, the driving roller 20*b*, the pressing unit 23, the ejecting unit 12, and the driven roller are disposed from upstream toward downstream in the transport direction T of the medium M, as illustrated in FIG. 2. Below, each of the constituent elements will be described in this order.

The removing unit 30 is disposed upstream of the driving roller 20*b* in the transport direction T so as to be brought into contact with the second surface M2 of the medium M wound around the roll unit R. The position of the removing unit is provided upstream of the pressing unit 23 and the ejecting unit 12 in the transport direction T. The removing unit 30 includes a removing roller 30*a*, and is able to rotate together with the roll unit R and the driving roller 20*b* through the transporting belt 20*a*.

In addition to the removing roller 30*a*, it is preferable that the removing unit 30 includes a pile-woven fabric 30*b* made of a removing member for the attached matter F and configured at the outer peripheral surface of the removing roller 30*a*. The pile-woven fabric 30*b* of the removing roller 30*a* is able to favorably remove the attached matter F from the second surface M2 of the medium M to transfer it to the transporting belt 20*a* side.

The removing unit 30 is also brought into contact with the portion of the transporting belt 20*a* at which the medium M is not mounted.

The removing roller 30*a* of the removing unit 30 does not have a drive source, and is a driven roller that is brought into contact with the transporting belt 20*a* of the transport unit 20 traveling toward the return direction C2 to rotate clockwise in a following manner.

At the time of rotating in a following manner, the pile-woven fabric 30*b* of the removing roller 30*a* of the removing unit 30 generates frictional resistance with the second surface M2 of the medium M. With this frictional resistance, the attached matter F attached on the second surface M2 is rubbed with the pile-woven fabric 30*b*, thereby being able to be moved to the pile-woven fabric 30*b* side. This configuration enables the ejecting unit 12 to eject a liquid to the second surface M2 of the medium M from which the attached matter F has been removed, thereby being able to perform recording. In addition, the removing unit 30 is able to suppress attachment of the attached matter F on the pressing unit 23 disposed downstream in the transport direction T.

Note that the above-described glue having adhesiveness that makes it easy for the attached matter F to adhere is applied to a side of the transporting belt 20*a* that is brought into contact with the first surface M1 of the medium M and the removing unit 30.

In this manner, the removing unit 30 is able to come into contact with the second surface M2 of the medium M and also come into contact with the portion of the transporting belt 20*a* at which the medium M is not mounted.

The attached matter F on the second surface M2 of the medium M is brought into contact with the roll unit R, the removing unit 30, and the transporting belt 20*a* in this order while rotating, and is transferred.

The medium M having the second surface M2 from which the attached matter F has been removed is pulled out from the roll unit R toward the transport direction T with the feeding portion 21 that rotates counterclockwise. At this time, the roll unit R is brought into contact with the removing unit 30 while rotating counterclockwise.

The feeding portion 21 includes a feed motor and a feed roller that are not illustrated in the drawing, and is able to pull out the medium M at a predetermined velocity under control of the control unit 10.

The braking unit 22 is configured to include a braking roller configured to apply predetermined tension to the medium M, and two braking-driven rollers disposed upstream and downstream of the braking roller in the transport direction T.

The braking unit 22 may include a braking-roller movement mechanism that is not illustrated in the drawing and moves the position of the braking roller. The braking unit 22 is able to move the position of the braking roller under control of the control unit 10 to apply the predetermined tension to the medium M.

The pressing unit 23 is disposed upstream of the ejecting unit 12 in the transport direction T and is disposed downstream of the removing unit 30 in the circumferential direction of the transporting belt 20*a*. The pressing unit 23 is brought into contact with the second surface M2 of the medium M with a predetermined pressure, which makes it possible to cause the first surface M1 to be brought into close contact with the transporting belt 20*a*.

The pressing unit 23 includes a pressing roller configured to be brought into contact with the second surface M2 of the medium M, be able to rotate clockwise, and be able to slide in the upstream-downstream direction in the transport direction T. In addition, the pressing unit 23 may include a pressing-roller movement mechanism that is not illustrated in the drawing and cause the position of the pressing roller relative to the medium M to advance and retreat in the vertical direction. The pressing unit 23 advances and retreats the position of the pressing roller in the vertical direction with the pressing-roller movement mechanism under control of the control unit 10, thereby making it possible to cause the first surface M1 of the medium M to be brought into close contact with the transporting belt 20*a* with a predetermined pressure.

The attached matter F that has been transferred from the removing unit 30 is attached on the surface of the transporting belt 20*a* that is brought into contact with the first surface M1 of the medium M. By using the pressing unit 23 to cause the first surface M1 to be brought into close contact with the transporting belt 20*a* with a predetermined pressure, it is possible to suppress the unevenness of the front surface of the second surface M2 serving as the recording surface, even when the attached matter F exists on the transporting belt 20*a*. Thus, it is possible to obtain favorable recording quality when recording is performed on the second surface M2 using the ejecting unit 12.

As illustrated in FIG. 2, the ejecting unit 12 is disposed downstream of the driving roller 20*b* and upstream of the driven roller 20*c* in the circumferential direction C of the transporting belt 20*a*.

In addition, in the outward direction C1 of the transporting belt 20*a*, the ejecting unit 12 is disposed at a position that is opposed to the second surface M2 of the medium M transported in the transport direction T by the transport unit 20.

The ejecting unit 12 is configured to include an ink-jet type head, a carriage, and a carriage motor.

The liquid ejecting device 1 is configured such that an ink cartridge or an ink tank that stores, for example, ink of each color of CMYK (Cyan, Magenta, Yellow, Black) serving as ink colors is able to be mounted.

In addition, the liquid ejecting device 1 includes a supplying mechanism that is not illustrated in the drawing and is configured to supply the head with ink from the ink cartridge or the like. The supplying mechanism supplies ink of each color to a nozzle of a corresponding head from the ink cartridge or the like.

The head of the ejecting unit 12 is mounted at the carriage, and together with the carriage, reciprocates above the medium M mounted at the transporting belt 20*a* in the forward and rearward direction with the carriage motor. Under control of the control unit 10 on the basis of recorded data, the head is configured to eject an ink droplet, which is a liquid, from the nozzle to the second surface M2 of the medium M while moving above the medium M, thereby making it possible to perform recording. The recorded data is held in the storage unit 11. It may be possible to read out the recorded data from a storage medium by a reading unit included in the storage unit 11 or it may be possible to acquire it from an external device.

Note that the ink color may include, for example, light and dark colors of CMYK, and it may be possible to employ a given combination of four or more colors.

Furthermore, the head may be configured to include a nozzle that ejects a penetrant liquid to the medium M. The penetrant liquid is a liquid configured to help an ink droplet landing on the second surface M2 of the medium M soak into the first surface M1.

Next, as illustrated in FIG. 2, in the circumferential direction C of the transporting belt 20*a*, the cleaning unit 31 and the removing unit 30 are disposed from downstream of the driven roller 20*c* toward upstream of the driving roller 20*b*. Below, description will be made in this order.

The cleaning unit 31 is disposed upstream of the removing unit 30 in the return direction C2 of the transporting belt 20*a*.

After recording by the ejecting unit 12 is completed and the medium M is peeled off, the cleaning unit 31 cleans a portion of the transporting belt 20*a* at which the medium M is not mounted, thereby making it possible to remove the attached ink. At the same time, the cleaning unit 31 cleans a portion of the transporting belt 20*a* at which the medium M is not mounted, thereby making it possible to remove the attached matter F that has been attached. Thus, the attached matter F from the removing unit 30 can be favorably attached again on the transporting belt 20*a* that has been cleaned and from which the attached matter F is removed.

The cleaning unit 31 is configured to include a brush roller 31*a*, a motor for the brush roller that is not illustrated in the drawing, and a wiping blade 31*c*. A brush is formed at the outer peripheral surface of the brush roller 31*a*. The cleaning unit 31 causes the brush roller 31*a* to rotate with the motor for the brush roller under control of the control unit 10, thereby making it possible to clean the transporting belt 20*a* while rubbing it with the brush.

The cleaning tank 31*b* stores a cleaning liquid, and is configured to supply or discharge the liquid so that the liquid surface is constant. The brush roller 31*a* is put, to a certain depth, into the cleaning liquid stored in the cleaning tank 31*b*, and the attached matter F or the like attached at the time of cleaning is removed.

Note that the brush roller 31*a* may be cloth, a sponge, or the like having a tubular shape, or may be a brush, a plate-shape rubber, resin, or the like.

The cleaning liquid or the attached matter F attached on the transporting belt 20*a* that has been cleaned by the brush roller 31*a* is wiped off by the wiping blade 31*c*.

The cleaning unit 31 may include a wiping-blade movement mechanism that is not illustrated in the drawing and is configured to advance and retreat the position of the wiping blade 31*c* relative to the transporting belt 20*a*. The cleaning unit 31 advances and retreats the position of the wiping blade 31*c* with the wiping-blade movement mechanism under control of the control unit 10, thereby making it possible to adjust the strength of press of the wiping blade 31*c* against the transporting belt 20*a*.

Note that the wiping blade 31*c* may be rubber having a wiper shape, resin having a plate shape, or the like.

After the attached matter F attached on the transporting belt 20*a* is removed with the cleaning unit 31, the removing unit 30 is brought into contact with the transporting belt 20*a* again as described above, whereby it is possible to transfer the attached matter F attached on the removing unit 30 to the transporting belt 20*a* side.

2. Liquid Ejecting Device According to Second Embodiment

Figure 3:
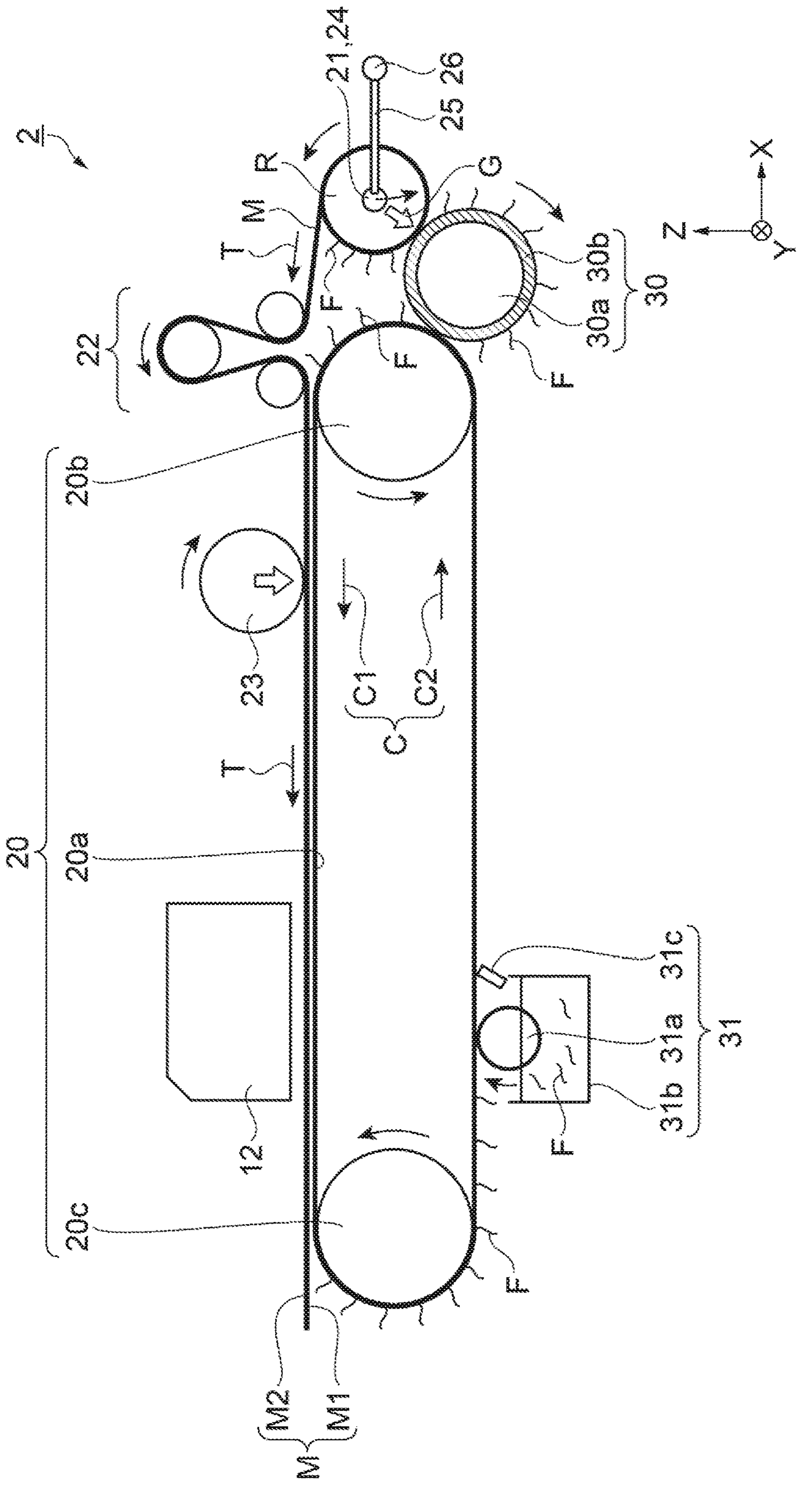
FIG. 3 is a schematic view illustrating the configuration of a liquid ejecting device according to a second embodiment.

A liquid ejecting device 2 according to a second embodiment illustrated in FIG. 3 differs from the liquid ejecting device 1 according to the first embodiment illustrated in FIG. 2 and described above, mainly in the position of the removing unit 30 and in that a member configured to support the roll unit R in a movable manner is provided. Below, the liquid ejecting device 2 will be described mainly in terms of portions differing from the liquid ejecting device 1, and explanation of configurations similar to those of the liquid ejecting device 1 will not be repeated.

Note that, in the liquid ejecting device 2 illustrated in FIG. 3, similar reference characters are attached to constituent elements similar to those of the liquid ejecting device 1 illustrated in FIG. 2.

A rotary shaft 26 is rotatably fixed to a housing of the liquid ejecting device 2. An arm 25 serving as an arm portion extends from the rotary shaft 26 to connect the rotary shaft 26 and a set unit 24. The set unit 24 supports the shaft of the roll unit R. A user is able to attach the shaft of the roll unit R to the set unit 24, thereby making it possible to mount the roll unit R to the liquid ejecting device 2.

The arm 25 enables the set unit 24 to rotate toward the downward direction with the rotary shaft 26 being the center of rotation. The roll unit R attached to the set unit 24 is able to be pressed against the removing unit 30 along an arc-shape trajectory having a radius of the length of the arm 25, with the rotary shaft 26 being the center of rotation. Note that it is preferable that the set unit 24 includes a feeding portion 21. The feeding portion 21 causes the shaft of the roll unit R to rotate counterclockwise, thereby making it possible to pull the medium M out of the roll unit R.

The removing unit 30 is disposed at a position that is able to come into contact with a portion of the transporting belt 20*a* at which the medium M is not mounted and a portion of the transporting belt 20*a* that is wound around the driving roller 20*b*. The removing unit 30 is able to rotate clockwise in a following manner while coming into contact with the transporting belt 20*a* and the roll unit R.

The attached matter F of the second surface M2 of the medium M is brought into contact with the roll unit R, the removing unit 30, and the transporting belt 20*a* in this order while these are rotating, and is transferred.

Even when the diameter of the roll unit R reduces as the medium M is used, the roll unit R is able to keep coming into contact with the removing unit 30 with its own weight while rotating with the rotary shaft 26 being the center of rotation. At this time, the roll unit R is able to press against the removing unit 30 with a pressing force G with its own weight.

In this manner, even when the diameter of the roll unit R gradually changes as the medium M is pulled out from the roll unit R, the arm portion rotates and gradually moves downward with the weight of the roll unit R. This enables the roll unit R to keep coming into contact while pressing against the removing unit 30 with the pressing force G.

3. Liquid Ejecting Device According to Third Embodiment

Figure 4:
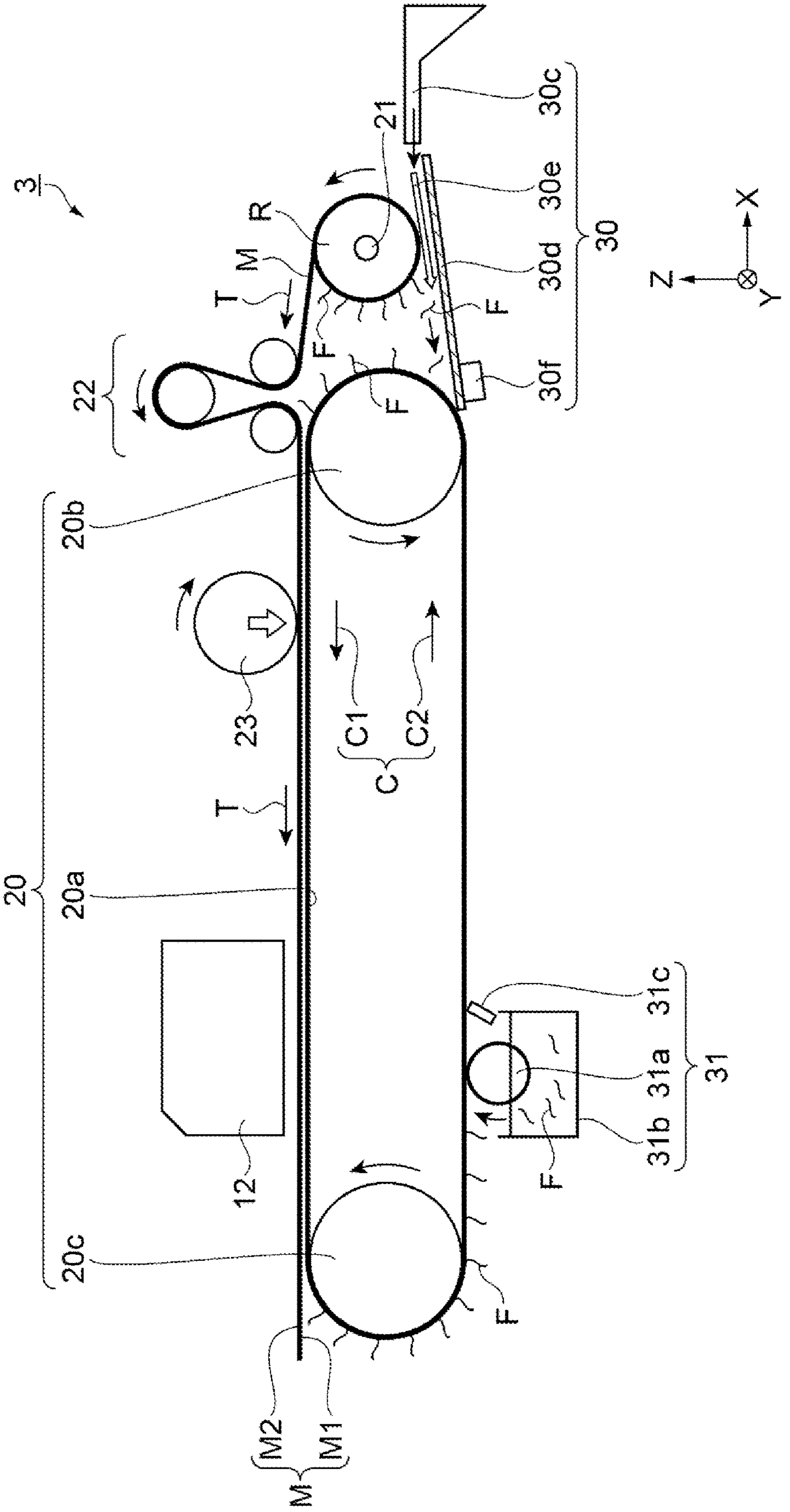
FIG. 4 is a schematic view illustrating the configuration of a liquid ejecting device according to a third embodiment.

A liquid ejecting device 3 according to a third embodiment illustrated in FIG. 4 differs from the liquid ejecting device 1 according to the first embodiment illustrated in FIG. 2 and described above, mainly in the configuration of and the position of the removing unit 30. Below, the liquid ejecting device 3 will be described mainly in terms of portions differing from the liquid ejecting device 1, and explanation of configurations similar to those of the liquid ejecting device 1 will not be repeated.

Note that, in the liquid ejecting device 3 illustrated in FIG. 4, similar reference characters are attached to constituent elements similar to those of the liquid ejecting device 1 illustrated in FIG. 2.

Unlike the removing unit 30 of the liquid ejecting device 1 that includes the removing roller 30*a*, the removing unit 30 of the liquid ejecting device 3 is configured to include an air blowing unit 30*c*, a guide 30*d*, and a flow path 30*e*. The air blowing unit 30*c* of the removing unit 30 is disposed upstream of the driving roller 20*b* in the transport direction T, and is able to remove an attached matter attached on the medium M.

The air blowing unit 30*c* of the removing unit 30 includes a fan. The flow path 30*e* of a gas with the air blowing unit 30*c* passes through the second surface M2 of the medium M, and extends toward a portion of the transporting belt 20*a* at which the medium M is not mounted, this portion also being a portion of the transporting belt 20*a* wound around the driving roller 20*b*. The air blowing unit 30*c* is able to blow a gas along the flow path 30*e*.

The air blowing unit 30*c* of the removing unit 30 blows a gas to cause the attached matter F on the second surface M2 of the medium M at the roll unit R to fly toward the transporting belt 20*a* at which the medium M is not mounted and that is wound around the driving roller 20*b*, thereby making it possible to transfer it.

The roll unit R is disposed upstream of the driving roller 20*b* in the transport direction T, and is disposed such that the flow path 30*e* passes through the second surface M2 of the medium M. At least a portion of the guide 30*d* is opposed to the roll unit R, and the guide 30*d* restricts the flow path 30*e*. Specifically, the upper side of the flow path 30*e* passes through the second surface M2 of the medium M at the roll unit R, and the lower side of the flow path 30*e* is restricted by the guide 30*d*.

The attached matter F attached on the second surface M2 of the medium M is blown by the air blowing unit 30*c* toward a portion of the transporting belt 20*a* that is wound around the driving roller 20*b*. At this time, as the guide 30*d* restricts the flow path 30*e* from the downward direction, it is possible to prevent the attached matter F from scattering in the downward direction, which makes it possible to more reliably cause it to be attached on the transporting belt 20*a*.

The air blowing unit 30*c* is disposed at a position higher in the vertical direction than the position of the transporting belt 20*a* directed from the driven roller 20*c* toward the driving roller 20*b* in the circumferential direction C of the transporting belt 20*a*.

That is, the air blowing unit 30*c* blows a gas toward the transporting belt 20*a* wound around the driving roller 20*b*, and hence, is disposed in the vertical direction between the transporting belt 20*a* toward the outward direction C1 and the transporting belt 20*a* toward the return direction C2.

In the example in FIG. 4, the diameter of the driving roller 20*b* is configured to be larger than the diameter of the roll unit R. The upper side of the flow path 30*e* passes through the lower portion of the roll unit R, and then, is directed toward the lower portion of the driving roller 20*b* around which the transporting belt 20*a* is wound. The lower side of the flow path 30*e* is restricted with the guide 30*d*.

The guide 30*d* is sloped in the vertical direction such that the position ascends toward the air blowing unit 30*c* and descends toward the transporting belt 20*a*. In this manner, the flow path 30*e* is configured to form a gentle angle.

The transporting belt 20*a* is a glue belt having the glue described above and serving as an adhesive layer at a surface thereof that is brought into contact with the first surface M1 of the medium M. The glue has a property in which adhesiveness enhances with heat. The transporting belt 20*a* wound around the driving roller 20*b* and attaching the attached matter F blown by the air blowing unit 30*c* is disposed near the guide 30*d* disposed downstream of the flow path 30*e*. At a position near the driving roller 20*b*, a heater 30*f* is mounted at the guide 30*d*, and is able to heat the guide 30*d*.

Radiant heat from the heated guide 30*d* enables the transporting belt 20*a* to be heated, which makes it possible to enhance the adhesiveness of the glue.

The attached matter F blown toward the transporting belt 20*a* from the medium M at the roll unit R is more likely to be attached on the glue of the transporting belt 20*a* having the adhesiveness enhanced by the heater 30*f* mounted at the guide 30*d*.

In addition, the glue having the enhanced adhesiveness makes it easy for the first surface M1 of the medium M to be brought into close contact with the transporting belt 20*a*. Even when the attached matter F exists between the first surface M1 of the medium M and the transporting belt 20*a*, the unevenness is more suppressed at the front surface of the second surface M2 serving as the recording surface. This makes it possible to obtain favorable recording quality when recording is performed on the second surface M2 by the ejecting unit 12.

As described above, the liquid ejecting devices 1 and 2 include the removing unit 30 disposed upstream of the driving roller 20*b* in the transport direction T and configured to be brought into contact with the second surface M2 of the medium M and also brought into contact with a portion of the transporting belt 20*a* at which the medium M is not mounted. The removing unit 30 is able to remove the attached matter F attached on the medium M and transfer it to the transporting belt 20*a* side.

The liquid ejecting devices 1 and 2 are able to remove the attached matter F attached on the medium M by using the removing unit 30. In addition, with the cleaning unit 31 configured to clean the transporting belt 20*a* to remove attached ink, it is possible to remove the attached matter F attached on the transporting belt 20*a*.

The liquid ejecting devices 1 and 2 remove the attached matter F attached on the medium M in this manner, and hence, do not require a large number of dedicated components, achieving a simplified configuration.

In addition, the liquid ejecting device 3 includes the removing unit 30 including the air blowing unit 30*c* disposed upstream of the driving roller 20*b* in the transport direction T and configured to blow a gas along the flow path 30*e* passing through the second surface M2 of the medium M and toward a portion of the transporting belt 20*a* at which the medium M is not mounted. The removing unit 30 is able to remove the attached matter F attached on the medium M to transfer it to the transporting belt 20*a* side.

The liquid ejecting device 3 is able to remove the attached matter F attached on the medium M by using the removing unit 30 including the air blowing unit 30*c*. In addition, with the cleaning unit 31 configured to clean the transporting belt 20*a* to remove attached ink, it is possible to remove the attached matter F attached on the transporting belt 20*a*.

The liquid ejecting device 3 removes the attached matter F attached on the medium M in this manner, and hence, does not require a large number of dedicated components, achieving a simplified configuration.

These are detailed descriptions of the embodiments with reference to the drawings. However, the specific configurations are not limited to these embodiments. It is possible to make modification, replacement, deletion, or the like without departing from the main point of the present disclosure.

For example, the examples described above have been described such that the ejecting unit 12 of the liquid ejecting device 1, 2, 3 is of a serial type in which a head is mounted at the carriage and moves. However, it may be possible to employ a line type in which no carriage is provided and the head is fixed. In addition, the transport unit 20 may include a winding device disposed near the driving roller 20*b* and configured to wind the medium M peeled off from the transporting belt 20*a*.

In the example described above, the liquid ejecting devices 1, 2, and 3 include the feeding portion 21, the braking unit 22, and the pressing unit 23. However, when the transport force by the transport unit 20 is sufficient, the feeding portion 21 may not be provided. When sufficient tension can be applied to the medium M by the transport unit 20, the braking unit 22 may not be provided. When the transporting belt 20*a* can be sufficiently brought into close contact with the medium M, the pressing unit 23 may not be provided.

Furthermore, the liquid ejecting devices 1, 2, and 3 may include a drying device configured to dry the cleaning liquid attached on the transporting belt 20*a*, an applying device configured to apply a glue to the transporting belt 20*a*, or the like.

What is claimed is:

1. A liquid ejecting device comprising:

a transport unit including a transporting belt at which a medium is mounted with the transporting belt in contact with a first surface of the medium, the transporting belt having an endless shape and configured to transport the medium in a transport direction, the transport unit also including a first roller and a second roller over which the transporting belt is stretched;

an ejecting unit configured to eject a liquid to a second surface of the medium mounted at the transporting belt downstream of the first roller in a circumferential direction of the transporting belt and upstream of the second roller;

a cleaning unit configured to clean a portion of the transporting belt downstream of the second roller in the circumferential direction of the transporting belt and upstream of the first roller, the portion being a portion at which the medium is not mounted; and a removing unit provided upstream of the first roller in the transport direction and configured to remove deposits deposited on the medium, wherein the removing unit is brought into contact with the second surface of the medium, and is brought into contact with a portion of the transporting belt where the medium is not mounted.

2. The liquid ejecting device according to claim 1, wherein the removing unit is a pile-woven fabric.

3. The liquid ejecting device according to claim 1, wherein the medium includes a roll unit wound around a roll shaft, the roll unit is disposed upstream of the first roller in the transport direction, and the removing unit is brought into contact with the second surface of the medium at the roll unit.

4. The liquid ejecting device according to claim 3, further comprising:

a set unit to which the roll unit is attached;

a rotary shaft configured to rotatably support the set unit; and an arm portion configured to connect the rotary shaft and the set unit, wherein the arm portion is configured to enable the set unit to rotate toward the removing unit with the rotary shaft being a center of rotation.

5. The liquid ejecting device according to claim 1, further comprising;

a pressing roller configured to be brought into contact with the second surface of the medium and slide in an upstream-downstream direction in the transport direction, wherein the pressing roller is disposed upstream of the ejecting unit in the transport direction and also downstream of the removing unit in the circumferential direction of the transporting belt.

6. The liquid ejecting device according to claim 1, wherein the removing unit is a driven roller configured to rotate in a following manner.

7. A liquid ejecting device comprising:

a transport unit including a transporting belt at which a medium is mounted with the transporting belt in contact with a first surface of the medium, the transporting belt having an endless shape and configured to transport the medium in a transport direction, the transport unit also including a first roller and a second roller over which the transporting belt is stretched;

an ejecting unit configured to eject a liquid to a second surface of the medium mounted at the transporting belt downstream of the first roller in a circumferential direction of the transporting belt and upstream of the second roller;

a cleaning unit configured to clean a portion of the transporting belt downstream of the second roller in the circumferential direction of the transporting belt and upstream of the first roller, the portion being a portion at which the medium is not mounted; and a removing unit provided upstream of the first roller in the transport direction and configured to remove deposits deposited on the medium, wherein the removing unit includes an air blowing unit configured to blow a gas along a flow path running through the second surface of the medium toward a portion of the transporting belt where the medium is not mounted.

8. The liquid ejecting device according to claim 7, wherein the medium includes a roll unit wound around a roll shaft, the roll unit is disposed upstream of the first roller in the transport direction, the flow path passes through the second surface of the medium at the roll unit, and the liquid ejecting device includes a guide configured to restrict the flow path, at least a portion of the guide being opposed to the roll unit.

9. The liquid ejecting device according to claim 8, wherein the air blowing unit is disposed at a position higher in a vertical direction than a position of the transporting belt directed from the second roller toward the first roller in the circumferential direction, and the guide is sloped so as to have a height higher near the air blowing unit and have a height lower near the transporting belt in the vertical direction.

10. The liquid ejecting device according to claim 8, wherein the transporting belt is a glue belt including an adhesive layer at a surface brought into contact with the first surface of the medium, and a heater configured to heat the guide is provided.

* * * * *